(12) United States Patent
Calhoun

(10) Patent No.: US 6,581,365 B1
(45) Date of Patent: Jun. 24, 2003

(54) CONTROLLING THERMALLY INDUCED BEAM TWIST

(75) Inventor: Dennis V. Calhoun, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 10/007,778

(22) Filed: Dec. 7, 2001

(51) Int. Cl.⁷ .......................... D01H 13/26; H01J 23/00
(52) U.S. Cl. ................. 57/3; 57/282; 315/500
(58) Field of Search ................ 315/500; 57/210, 57/282, 290, 295, 296, 3, 10–14; 416/25, 28, 30, 31, 61

(56) References Cited

U.S. PATENT DOCUMENTS

| | | | | |
|---|---|---|---|---|
| 4,898,515 A | | 2/1990 | Beno et al. ............. 416/134 A |
| 4,976,417 A | | 12/1990 | Smith ......................... 267/25 |
| 4,984,776 A | * | 1/1991 | Smith et al. ................ 267/276 |
| 5,000,430 A | * | 3/1991 | Smith ......................... 267/273 |
| 5,346,149 A | * | 9/1994 | Cobb ....................... 242/441.3 |
| 5,961,288 A | * | 10/1999 | Rene Legendre et al. .. 416/134 A |
| 6,375,426 B1 | * | 4/2002 | Brack et al. ............ 416/134 A |

\* cited by examiner

*Primary Examiner*—Don Wong
*Assistant Examiner*—Minh D A
(74) *Attorney, Agent, or Firm*—Akerman Senterfitt

(57) ABSTRACT

Twist control system and method for controlling twisting distortion in a beam caused by temperature changes. In a beam having an inherent amount of temperature induced twisting a wrap can be helically bonded to the beam. The wrap has a wrap material type, a wrap cross-sectional profile, and a wrap angle that can be selectively chosen for providing a desired twist control of the beam. The twist control applies a twisting force to the beam which is approximately proportional to the temperature change. The twist control can be used to eliminate the thermally induced twist associated with a particular beam or for providing a desired amount of twist.

22 Claims, 4 Drawing Sheets

CONTROLLING THERMALLY INDUCED BEAM TWIST

BACKGROUND OF THE INVENTION

1. Technical Field

The inventive arrangements relate generally to methods and apparatus for controlling composite structure deformation, and more particularly to the use of post cure techniques for controlling distortion caused by bulk temperature changes.

2. Description of the Related Art

Composite structures are widely utilized in a variety of devices and systems, including spaced based applications. However, variations in temperature can result in distortion of the structural components manufactured from such composite materials. For example, in the case of composite beams, torsional twisting about the longitudinal axis of the beam may occur due to variations in the coefficient of thermal expansion among the various plys. Such twisting can be intensified due to errors in the laminate ply angles which may occur due to imperfections in the manufacturing process.

Twisting distortions in composite beams can be a serious problem, particularly in high precision space based applications where bulk temperature variations are common. For example, when composite tube beams are used for antenna reflector applications, such twisting can cause reflector distortion, which in turn may cause mis-pointing and de-focusing of the reflector. According, distortion of composite beams can be a serious problem and may significantly reduce the overall performance of the corresponding system.

Several attempts have been made to develop composite beams suitable to withstand bulk temperature changes without twisting or distortion. For instance, efforts have been made to reduce the ply angle errors in the composite tubes by holding tighter tolerances during the manufacturing process. However, the manufacturing of composite beams inherently includes a certain minimal amount of ply angle errors. Additionally, higher manufacturing tolerances require great care be taken during the manufacturing process. Consequently, this method can be extremely expensive and time consuming while still resulting in beams which may distort.

Other efforts to produce satisfactory composite beams include building several component beams and subsequently measuring the twist or distortion of each one. Composite beams having minimal twist can then be selected for usage, while the remaining ones are discarded. In addition to being expensive, this process is wasteful and results in the manufacturing of several inadequate composite beams.

Occasionally, there may also be instances where it is desirable to intentionally cause a composite beam to twist to a predetermined extent in the event of a bulk temperature change. Such twisting may be used, for example, to counteract the effects of temperature distortion associated with other mechanical components in the system. In such instances, it is desirable to selectively cause the beam to twist in a controlled manner for a given temperature change. Accordingly, there exists a need for a method and apparatus of controlling composite beam that does not depend on ply angle and is simple to use on existing composite beams.

SUMMARY OF THE INVENTION

The invention concerns a method and system for controlling distortion in a beam caused by temperature changes. The method of the invention includes the steps of determining a desired amount of twist control needed for applying a twisting force to the beam in response to a temperature variation. A wrap is selected for providing the desired twist control of the beam. The wrap comprises a wrap material type, a wrap cross-sectional profile, and a selected wrap angle. The wrap is positioned on the beam in a helical pattern using the selected wrap angle and then attached to the beam. The twist control can be used to reduce beam twist increase beam twist.

The wrap can be bonded to the outer surface of the beam using a resin adhesive. For example, the resin adhesive can be an epoxy. According to a preferred embodiment, the resin adhesive is selected for curing without substantial heating.

The wrap material type can be isotropic provided that the wrap cross-sectional profile is selectively chosen to provide the desired characteristics. For example the wrap material type can be at least partially comprised of metal. For isotropic materials the wrap profile is particularly important. A wrap height, measured from the surface of the beam, which is approximately as large as a width of the wrap has been found to provide good results in this regard. For example, the wrap cross-sectional profile can be round.

The invention is particularly well suited for beams of a composite construction that are known to sometimes twist due to thermal distortions.

The selection of the wrap can be an iterative process whereby a twist control applied by a proposed wrap is calculated and compared to the desired amount of twist control. Further, this iterative process can include modifying at least one of a wrap material, wrap cross-sectional profile, and wrap angle and re-calculating the twist control applied by the wrap as modified to determine if it provides the desired amount of twist control obtained thereby until satisfactory results are achieved.

Notably, the selection of the wrap material can comprise selecting a wrap structural member and a wrap bonding agent. Further, two or more such wraps can be applied to the beam for obtaining the desired amount of twist control.

According to an alternative embodiment, the invention also concerns a twist control system for controlling distortion in a beam caused by temperature changes. The invention is particularly useful in the case of a beam having an inherent amount of temperature induced twisting associated therewith. A wrap, comprising a wrap material type, a wrap cross-sectional profile, and a wrap angle are helically bonded to the beam. The wrap material, wrap cross-sectional profile and wrap angle are selectively chosen for providing a desired twist control of the beam. The twist control applies a predetermined twisting force to the beam in response to a temperature change. The wrap can be used to eliminate an inherent amount of temperature induced twisting of the beam is eliminated by the wrap. As noted above, the wrap can be comprised of a structural member and a bonding agent. For example, the structural member can be a metal wire and the bonding agent can be an epoxy resin. Multiple wraps can likewise be used wherein each of the wraps are selectively chosen for the beam to provide the desired twist control.

BRIEF DESCRIPTION OF THE DRAWINGS

There are presently shown in the drawings embodiments that are presently preferred, it being understood, however, that the invention is not limited to the precise arrangements and instrumentalities shown.

DETAILED DESCRIPTION OF THE PREFERRED EMBODIMENTS

The invention concerns a method and system for controlling thermally induced distortion or twisting in a beam. In its simplest form, the invention can be implemented by determining an amount of twist inherent to a beam as caused by a temperature change and then applying one or more helical wraps to the beam for selectively controlling the twisting action. The combination of wrap material type, wrap cross-sectional profile, and helical wrap angle are selectively chosen for providing a pre-determined control of beam twist. The wrap is then bonded to the beam using a suitable adhesive agent.

The invention as described herein is particularly well suited for use with composite beams. The multiple plies typically associated with the construction of such composite beams can, due to defects in manufacturing processes, sometimes cause a beam to twist when exposed to a temperature change. However, it will be appreciated by those skilled in the art that the inventive arrangements are not limited to use in the composite beam field. Instead, the techniques described herein can be applied to beams formed in any manner and of any material to the extent that it may be desirable to control beam twisting caused by a temperature change.

According to a preferred embodiment, the inventive arrangements can be used to substantially eliminate beam twist. However, it should be understood that the invention is not limited in this regard. While the most common application of the inventive arrangements may be the reduction or elimination of beam twisting caused by temperature variations, the techniques described herein can be equally effective for intentionally imparting a desired amount of twisting in a beam in response to a temperature variation.

Figure 1:
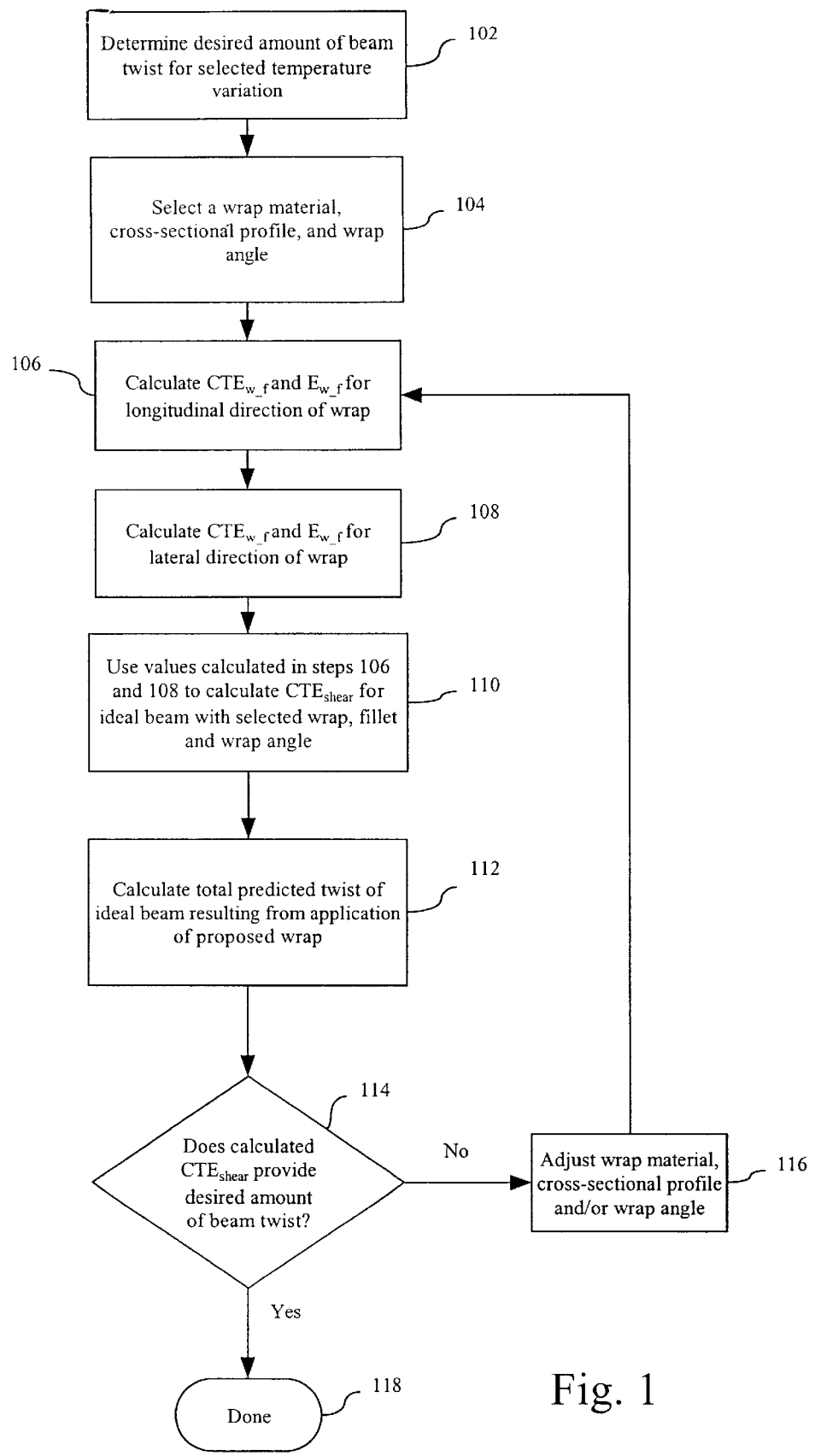
FIG. 1 is a flow chart useful for showing a method for reducing beam twist resulting from bulk temperature changes.
Figure 2:
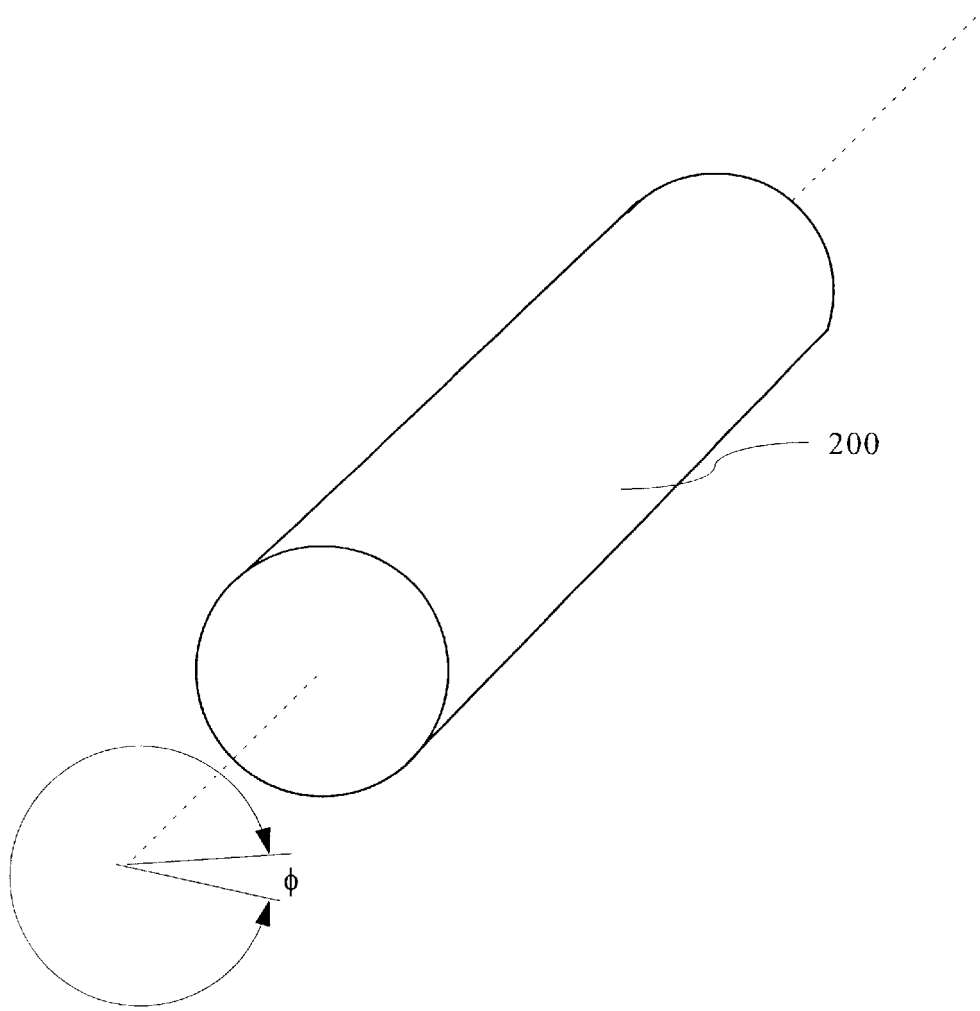
FIG. 2 is a perspective view of a beam useful for illustrating the concept of thermally induced twisting.

FIG. 1 is flow chart useful for describing a preferred method for controlling beam twist. The process can begin in step 102 by determining a desired amount of beam twist to be caused by a wrap for a selected bulk temperature change. Where a twisting action is desired to be eliminated from a beam, the value selected in step 102 will be equal and opposite to the twist inherent in a particular beam as caused by the selected temperature change. The amount of beam twist inherent in a particular beam can be determined by any suitable method. Empirical measurements are the most direct approach and are therefore preferred. Such measurements can be used to determine the average rotation angle per linear length of the beam. However, in a preferred embodiment, empirical methods can be used as shown in FIG. 2 to determine the total angular rotation φ for a beam 200 of a specified length, for a given temperature variation. The latter method is preferred due to possible variations in twisting which may occur along the length of the beam. Computer modeling or statistical methods may also be used where practical to determine these beam twist values. However, these methods are likely to provide less accurate results as compared to empirical measurements.

Once the foregoing information regarding the beam 200 has been obtained, an iterative approach can be used to identify the desired physical characteristics of a preferred wrap. In step 104, a wrap material, cross-sectional profile and wrap angle is selected. Step 104 may optionally include selecting a number of wraps to be used for a particular beam. The wrap material, as that term is used herein, may be comprised of two portions, namely a structural member and a bonding agent. The bonding agent is primarily used to bond the structural member to the beam. It should be noted however that the bonding agent can also affect the operation of the wrap in providing control over beam twist and its physical properties as a function of temperature must therefore also be considered.

The wrap is preferably sufficiently flexible so that it can be wrapped around the beam without damaging it. This is a particular concern when working with composite beam that may suffer surface abrasion or other physical damage during the wrapping process if the wrap is not sufficiently flexible. The wrap is preferably formed of materials that do not need an elevated cure or other processing in an autoclave after having been positioned on the beam.

A wrap for the purposes of the invention can be formed of aluminum or steel wire bonded to the beam with a suitable bonding agent. However, the invention is not limited in this regard and other materials may also be used. It should be noted that isotropic type materials can be used to form the wrap as provided that they conform to the other preferred characteristics of the wrap as set forth herein. In particular, when an isotropic wrap with a proper height to width ratio is bonded to the outside of the beam, it will have a different value of (CTE)*(Modulus of Elasticity) longitudinally as compared to laterally, where CTE refers to coefficient of thermal expansion. This characteristic makes the wrap appear to be non-isotropic, i.e. softer in a direction lateral (perpendicular) to the axis of the wrap as compared to the longitudinal direction parallel to the axis of the wrap. The non-isotropic effect will make the beam twist or will control any twisting action that may be inherent in a particular beam. By comparison, isotropic thin layers such as those that are typically used in construction of a composite beam, will not correct or control twist.

Figure 3:
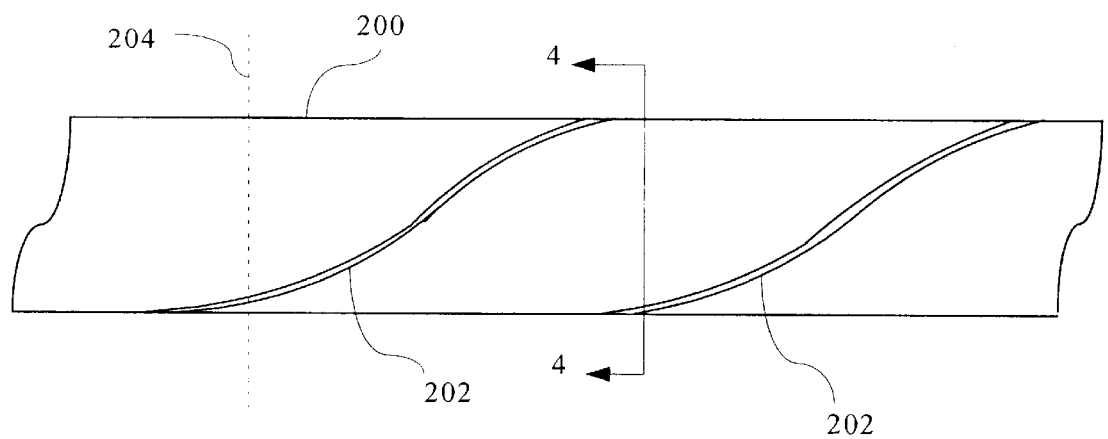
FIG. 3 is a side elevation view of a composite beam with a wrap helically bonded thereto for reducing thermally induced twist.
Figure 4:
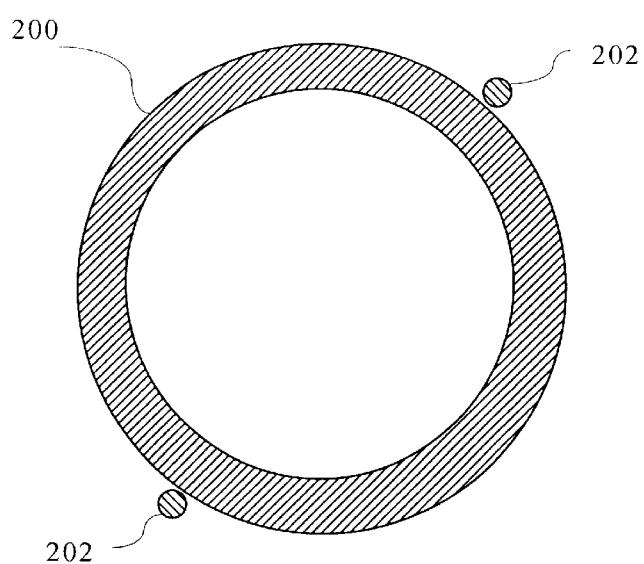
FIG. 4 is a cross-sectional view of the composite beam in FIG. 2 taken along line 2—2 in FIG. 2.

FIGS. 3 and 4 show a tubular beam 200 with two wraps 202 helically bonded thereto for controlling beam twist in accordance with a preferred embodiment of the invention. According to a preferred embodiment of the invention, two or more wraps 202 are preferably used. One wrap can also be used, but may cause undesirable bending effects in the beam. Where more than one wrap is used, the wraps are preferably arranged symmetrically as shown so as to prevent beam bending. FIG. 4 is a cross-sectional view of beam 200 taken along line 4—4 in FIG. 3. For purposes of illustration, the beam 200 is shown in the form of a tube, but it should be understood that the invention is not limited in this regard. In fact, the system and method disclosed herein can be used with structural beams having essentially any cross-sectional profile.

As used herein, the term "helical" is used broadly to refer to a wrap applied in the manner shown in the Figures. For example, when applied to a beam having a cylindrical cross-section, i.e. a tube, the wrap would be applied in the shape of a cylindrical helix. However the beam can also have a geometric cross-section of a different shape. For example, beams can have square, rectangular, or triangular cross-sections. In that case the wrap is preferably applied in a helical pattern that matches the cross-sectional shape of the beam. For example, the wrap may form a rectangular helix, a square helix or a triangular helix. Also, it will be appreciated that while the wrap can be applied in a continuous manner over the entire length of the beam, the invention is not so limited. For example, the wrap can be applied to only a portion of the beam. According to an alternative embodiment, the wrap may also be applied discontinuously in segments extending over all or part of the length of the beam.

Referring to step 104, it is also necessary to select a wrap angle. The wrap angle can be expressed in degrees or radians per unit axial length of the beam, or as an angle relative to a plane 204 perpendicular to the beam axis. For the purposes of step 104 an angle of 45 degrees can be arbitrarily selected as a starting point for the iterative process.

Figure 5:
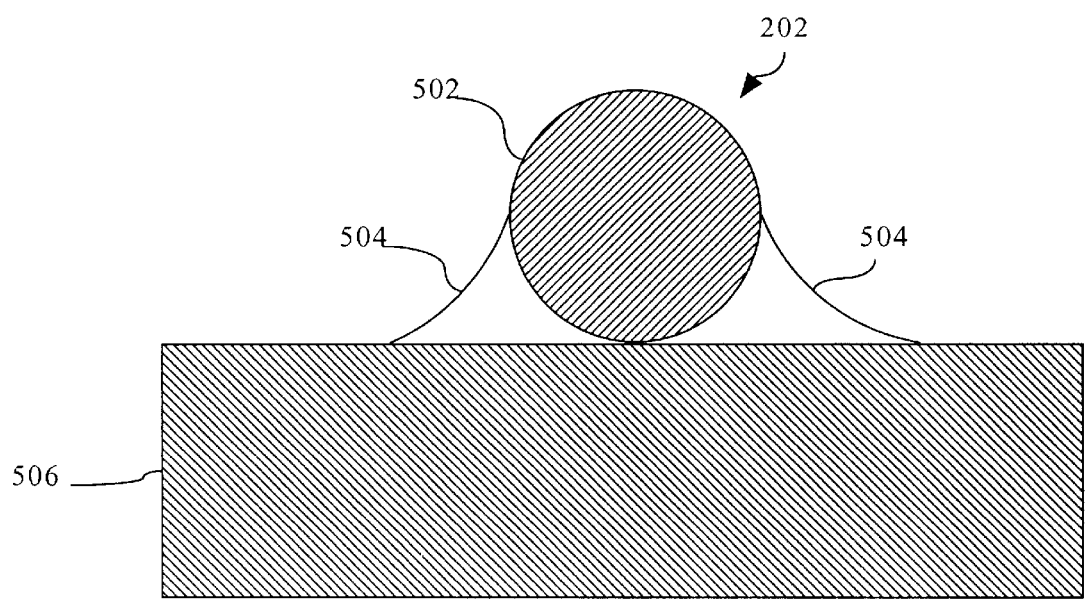
FIG. 5 is an enlarged cross-sectional view of a portion of the beam and the wrap in FIG. 3.

FIG. 5 is an enlarged view of a portion of the beam 200 in the area of wrap 202 showing wire 502 and fillets 504. In this example, the wrap is comprised of a wire rod having a circular cross-section. The wire wrap can be attached to the beam using any suitable technique. In FIG. 5, the wrap further includes fillets 504 that are comprised of a suitable bonding agent. It should be noted that the bonding agent for the wrap can be any suitable material for securely attaching the wrap to the beam. In the case of a wire 502 as described herein, a resin bonding agent can be used for this purpose. For example, there are numerous commercially available epoxy bonding agents which will provide satisfactory results. Other types of wraps may make use of different bonding agents and the invention is not limited in regard to the particular bonding agent selected.

The cross-sectional profile of the wrap is preferably selected so that it has only a minimal contact area with the beam. In this regard, the height of the wrap should have a height to width ratio of at least about 0.25. In this case, "height" refers to the thickness of the wrap determined relative to the axis of the beam. According to a preferred embodiment, the wrap can be selected so that the wrap is approximately as tall as it is wide. Wire rod having a circular cross-sectional profile is satisfactory for use in forming a wrap as it provides a minimal contact area and is at least as tall as it is wide. In evaluating the cross-sectional profile of the wrap in this case, the added width associated with resin fillets 504 is not a primary consideration as such fillets have a much lower modulus of elasticity as compared to the wire 502 and are therefore of only minor importance.

Once the wrap material, cross-sectional profile, wrap angle and bonding agent have been selected in step 104, the process of FIG. 1 continues with certain wrap calculations in steps 106 and 108 which are useful for determining the twisting effect of the wrap relative to the beam. In step 106 the coefficient of thermal expansion (hereinafter "CTE") and modulus of elasticity "E" is calculated for the longitudinal direction, i.e. along the axis of the wrap. In FIGS. 4 and 5, this would be the direction orthogonal to the surface of the page. Where the wrap comprises a combination of a structural member, such as wire 502 and bonding agent fillets 504, it is necessary to calculate a combined longitudinal CTE for the structural member and the bonding agent. In such instances, a similar combined value must be also be calculated for the longitudinal modulus of elasticity.

In step 108, the CTE and modulus of elasticity is calculated for the wrap in the lateral direction, i.e. orthogonal to the axis of the wrap. As with the longitudinal direction, if the wrap comprises a combination of structural member and bonding agent, it is necessary to calculate combined values for CTE and modulus of elasticity for the lateral direction.

In step 110, the CTE and modulus of elasticity values calculated in steps 106 and 108 are used, together with the information concerning wrap angle, to calculate a theoretical shear coefficient ($CTE_{shear}$) resulting from the proposed wrap applied to an ideal beam. For this purpose, the ideal beam is assumed to be one that has no twist associated therewith. In all other respects, the physical characteristics and dimensions of the ideal beam are chosen to correspond to the actual beam on which the wrap is intended to be used.

In step 112, the calculated value of $CTE_{shear}$ is used to calculate the total predicted twist caused to the ideal beam by the application of the proposed wrap for a selected temperature variation. The resulting value will be an angle that defines the total predicted twist caused to the ideal beam exclusively by the wrap. In step 114, a determination is made as to whether the total predicted twist calculated in step 112 is equal to the desired amount of twist identified in step 102. If not, then the wrap material (including any bonding agent), wrap cross-sectional profile, and/or wrap angle can be adjusted to obtain a predicted twist value that more closely matches the desired amount of twist from step 102. For example, experimental application of the foregoing technique has shown that the relationship between the cross-sectional area of the wrap and the resulting amount of twist is almost linear in many instances. Accordingly, the iterative process can rapidly achieve a satisfactory set of physical characteristics for the wrap. The process in steps 106 through 114 can be repeated until the predicted twist calculated in step 110 is equal to the desired twist identified in step 102. When this requirement is satisfied, the process is done and terminates in step 118.

The foregoing process may be better understood by an example with reference to FIGS. 1 through 5. In this example, assume tube 200 is a 3" diameter composite tube as shown in FIG. 3 and that the lay-up of tube 200 is M55J/954-3 with 15, 2.5 mil plies. (70,-70,0,0,30,-30,0,0, 0,-30,30,0,0,-70,70). In step 102, it is determined that the goal is to remove an existing twist φ from composite tube 200. The intent in this case would be to use the wrap to apply an equal and opposite amount of twist force to zero out the tube's inherent tendency to twist. For this example, assume that total measured twist is φ=0.00046 radian for a temperature change of 100 degrees F.

Proceeding now to step 104 in FIG. 1, the wrap is arbitrarily selected to be two wires 202 wrapped at a 45 degree angle. Each wire 202 is selected to be 0.038 inch diameter 304 annealed stainless rod (circular cross-sectional profile). The bonding agent is selected to be epoxy type EA939 shown as fillets 504 in FIG. 3. The coefficient of thermal expansion (CTE) and modulus elasticity for the stainless steel rod and epoxy selections are as follows:

$$CTE_{ss} := 8.65 \times 10^{-6} F^{-1} \quad E_{ss} := 29.0 \times 10^6 \text{ psi}$$

$$CTE_{ea} := 31.57 \times 10^{-6} F^{-1} \quad E_{ea} := .693 \times 10^6 \text{ psi}$$

Where F is the temperature in degrees Fahrenheit.

Using the foregoing values, we proceed as described in step 106 to calculate the longitudinal CTE and modulus of elasticity E for the combined rod/epoxy wrap as follows.

Longitudinal Calculations for Rod with Epoxy

For the purpose of these calculations, we use the rule of mixtures (same approach as composite codes):

$$Area_{ss} := 3.14159\left(\frac{.038 \text{ in}}{2}\right)^2 \qquad Area_{ea} := \frac{Area_{ss}}{2} \qquad Area_{ss\_ea:} = Area_{ss} + Area_{ea}$$

$$Area_{ss} = 1.134 \times 10^{-3} \text{ in}^2 \qquad Area_{ea} = 5.671 \times 10^{-4} \text{ in}^2 \qquad Area_{ss\_ea} = 1.701 \times 10^{-3} \text{ in}^2$$

$$Area_{gr} := .0375 \text{ in} \cdot 2 \cdot .036 \text{ in} \qquad Area_{gr} = 2.7 \times 10^{-3} \text{ in}^2$$

$$CTE_{ss\_ea:} = \frac{CTE_{ss} \cdot Area_{ss} \cdot E_{ss} + CTE_{ea} \cdot Area_{ea} \cdot E_{ea}}{Area_{ss} \cdot E_{ss} + Area_{ea} \cdot E_{ea}} \qquad CTE_{ss\_ea} = 8.921 \times 10^{-6} \frac{1}{F}$$

$$E_{ss\_ea} := \frac{Area_{ss} \cdot E_{ss} + Area_{ea} \cdot E_{ea}}{Area_{ss\_ea}} \qquad E_{ss\_ea} = 1.956 \times 10^7 \text{ psi}$$

Proceeding now to step 108, we calculate the combined lateral CTE and modulus of elasticity E for the wire and epoxy. Lateral Calculations:

Due to the aspect ratio of height and width, the rule of mixtures cannot be used directly. First, the shear compliance must be considered for the purpose of these calculations. The lateral shear compliance is what allows the wire wrap to correct the beam twist. Shear compliance is best determined with a finite element modeling (FEM) software application. In this case, the NASTRAN software application was used to model this cross-section. NASTRAN is a commercially available software application that may be purchased from MSC.Software Corporation of 2 MacArthur Place, Santa Ana, Calif. 92707 USA. However, any other suitable FEM software application can be used for this purpose.

In FIG. 5, the wire 502 actually goes at 45 degrees to the lay-up, but for the purposes of the present calculations, a wire at zero degrees is a good simplifying assumption that gives reasonable results. A 100 degree F. change in temperature (Delta T) was applied to the model to get its thermal distortion. The graphite section grew laterally $3.18 \times 10^{-6}$ inches each way from the centerline. Based on this information, the effective section lateral CTE from the NASTRAN model was:

$$CTE_{NASTRAN} := (2 \times 3.18 \times 10^{-6} \text{ in})/(0.076 \text{ in} \times 100F)$$

$$CTE_{NASTRAN} = 8.4 \times 10^{-7}/F$$

The lateral CTE ($CTE_{gr\_lat}$) and the lateral modulus of elasticity ($E_{gr\_lat}$) of the tube 200 are known. The CTE ($CTE_{ss\_ea\_lat}$) of the wire and epoxy in the lateral direction is approximated by using the longitudinal CTE ($CTE_{ss\_ea}$) calculated earlier. The effective lateral modulus of elasticity $E_{ss\_ea\_lat}$ of the wire and epoxy can now be determined several ways. For the purposes of this calculation, an iterative solution was chosen. Through an iterative process it was found that an $E_{ss\_ea\_lat}$ equal to $0.33 \times 10^6$ psi gives an overall lateral CTE ($CTE_{ss\_ea\_gr}$) of the wire, epoxy and tube of $8.4 \times 10^{-7}/F$. This matches the finite element model results of $CTE_{NASTRAN} = 8.4 \times 10^{-7}/F$ calculated above. The following equations show the calculation for $CTE_{ss\_ea\_gr}$.

Based upon the foregoing, it can be seen that the lateral stiffness represented by the calculated value of $E_{ss\_ea\_lat} = 0.33 \times 10^6$ is so small compared to the longitudinal stiffness $E_{ss\_ea} = 19.56 \times 10^6$ psi that using a zero lateral stiffness is not a bad assumption. If the wrap has a good enough aspect ratio (not much surface area on the tube relative to the wrap height), NASTRAN modeling may not be required and a zero lateral stiffness may be close enough for many applications.

Calculate $CTE_{shear}$

Proceeding now to step 110 in FIG. 1, it is necessary to calculate the $CTE_{shear}$ to determine the amount of tube twist resulting by the combination of the wrap 202 applied to the composite tube 200. Note that the theoretical $CTE_{shear}$ would be zero for the tube 200 without the wrap 202.

A composite code may be used for this purpose by simply treating the wrap as another composite ply. There are a variety of commercially available composite software applications that can be used for this purpose. In order to use the composite software application in this way, however, it will generally be necessary to provide as input data to the program a wire effective thickness. In particular, the composite code needs a wire thickness that when spread over the entire tube behaves like the two wires 502 and the associated epoxy bonding agent 504 comprising the wrap in our example. Given that the tube diameter is 3.0 inches and there are two wires per tube, we can calculate as follows Tube$_{dia}$:=3.0 in There are two wires per Tube or 1 wire per every:

Inches_per_wire:=(3.14*3.0 in)/2

Inches_per_wire=4.71 in

Effective_Wire_Thickness:=Area$_{ss\_ea}$/Inches_per_wire

Effective_Wire_Thickness=$3.612 \times 10^{-4}$ in

Using the foregoing value of Effective_Wire_Thickness, a composites code was run with the following lay-up:

1. Fifteen 2.5 mil plies of M55J/954-3
2. One 0.36 mil ply of the StainleesSteel_EA.epoxy (ss_ea) with stiffness and CTEs from the preceding calculations at 45 degrees.

$$E_{ss\_ea\_lat} := .33 \cdot 10^6 \cdot \text{psi} \qquad CTE_{gr\_lat} := .67 \cdot 10^{-6} \cdot \frac{1}{F} \qquad E_{gr\_lat} := 9.89 \times 10^6 \cdot \text{psi}$$

$$CTE_{ss\_ea\_gr} := \frac{CTE_{ss\_ea} \cdot Area_{ss\_ea} \cdot E_{ss\_ea\_lat} + CTE_{gr\_lat} \cdot Area_{gr} \cdot E_{gr\_lat}}{Area_{ss\_ea} \cdot E_{ss\_ea\_lat} + Area_{gr} \cdot E_{gr\_lat}}$$

$$CTE_{ss\_ea\_gr} = 8.4 \times 10^{-7} \frac{1}{F}$$

| Lay-Up Thickness | Angle | Material |
|---|---|---|
| .0025 | 70 | M55J/954-3 |
| .0025 | −70 | M55J/954-3 |
| .0025 | 0 | M55J/954-3 |
| .0025 | 0 | M55J/954-3 |
| .0025 | 30 | M55J/954-3 |
| .0025 | −30 | M55J/954-3 |
| .0025 | 0 | M55J/954-3 |
| .0025 | 0 | M55J/954-3 |
| .0025 | 0 | M55J/954-3 |
| .0025 | −30 | M55J/954-3 |
| .0025 | 30 | M55J/954-3 |
| .0025 | 0 | M55J/954-3 |
| .0025 | 0 | M55J/954-3 |
| .0025 | −70 | M55J/954-3 |
| .0025 | 70 | M55J/954-3 |
| .00036 | 45 | StainlessSteel_EA epoxy |

Material Properties:

| | E11 (psi) | E22 (psi) | G12 (psi) | NU-12 | NU-21 | CTEx (1/F) | CTEy (1/F) |
|---|---|---|---|---|---|---|---|
| M55J/954-3 | 42.3E6 | .96E6 | 5.65E6 | .25 | .006 | −6.E-6 | −.177E-4 |
| SS_EA | 19.6E6 | .33E6 | 5.65E6 | .31 | .008 | 8.9E-6 | 8.9E-6 |

G12 for the SS_EA is not critical and has not been calculated, it has been estimated to be the same as M55J/954-3 for the purposes of this run. The prediction from the composite code using above data:

$$CTE_{shear} = 2.15\text{E-}7 \ 1/F$$

Note that if NASTRAN modeling was not used in this case and the E22 for SS_EA was assumed to be zero then:

$$CTE_{shear} = 2.19 \times 10^{-7} 1/F$$

The minimal difference between the calculated value for $CTE_{shear}$ using the NASTRAN modeling to calculate lateral stiffness as compared to assuming a zero lateral stiffness demonstrates that assuming a zero lateral stiffness is not a bad assumption for the purpose of these calculations.

Calculate Predicted Beam Twist

Using the value of $CTE_{shear}$ from above, it is now possible to calculate the amount of tube twist caused to an ideal beam 200 when the proposed wrap 202 is applied.

We make the following assumptions:

$Tube_{dia} = 3.0$ in
$Tube_{length} = 35$ in
$DeltaT = 100$ F
$CTE_{shear} = 2.15 \times 10^{-7}/F$ Using these values we calculate:

$$Total_{predicted\_twist} := \frac{CTE_{shear} \cdot DeltaT \cdot Tube_{length}}{\frac{Tube_{dia}}{2.}}$$

$$Total_{predicted\_twist} = 0.00050 \text{ rad}$$

It will be recalled from step 102 that the desired tube twist to be achieved by application of the wrap was 0.00046 radian. This is very close to the value of 0.00050 radians predicted twist achieved by application of the proposed wrap. If this is sufficiently close to the desired value in step 114, then the process terminates in step 118. Otherwise, the physical characteristics of the proposed wrap can be adjusted slightly in step 116, and the process in steps 106–114 can be repeated to see if a closer match can be achieved. In any case, the application of the proposed wrap will substantially reduce the inherent twist associated with beam 200. Moreover, it should be noted that while the 0.00046 radian twist was at a 100 degree F. temperature change, the wrap will reduce twist for a large range of temperatures, positive and negative.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

I claim:

1. A method for controlling distortion in a beam caused by temperature changes, comprising:

determining a desired amount of twist control needed for applying a twisting force to said beam in response to a temperature variation;

selectively choosing a wrap, said wrap comprising a wrap material type, a wrap cross-sectional profile, and a selected wrap angle for providing said twist control of said beam;

positioning said wrap on said beam in a helical pattern using said selected wrap angle; and attaching said wrap to said beam.

2. The method according to claim 1 wherein said twist control results in a reduction in beam twist.

3. The method according to claim 1 wherein said twist control results in an increase in beam twist.

4. The method according to claim 1 further comprising bonding said wrap to said beam using a resin adhesive.

5. The method according to claim 4 wherein said resin adhesive is an epoxy.

6. The method according to claim 5 wherein said resin adhesive is selected for curing without substantial heating.

7. The method according to claim 1 wherein said wrap material type is isotropic.

8. The method according to claim 7 wherein said wrap cross-sectional profile is selectively chosen to have a height, measured from the surface of the beam, which is at about as large as a width of said wrap.

9. The method according to claim 1 wherein said wrap material type is metal.

10. The method according to claim 1 wherein said wrap cross-sectional profile is round.

11. The method according to claim 1 wherein said beam is a composite construction.

12. The method according to claim 1 wherein said selectively choosing step further comprises an iterative process whereby a twist control applied by a proposed wrap is calculated and compared to said desired amount of twist control.

13. The method according to claim 12 wherein said selectively choosing step further comprises modifying at least one of a wrap material, wrap cross-sectional profile, and wrap angle and re-calculating said twist control applied by said wrap as modified to determine if it provides said desired amount of twist control.

14. The method according to claim 1 wherein said selection of said wrap material comprises selecting a wrap structural member and a wrap bonding agent.

15. The method according to claim 1 further comprising selecting and applying at least two of said wraps to said beam for obtaining said desired amount of twist control.

16. A twist control system for controlling distortion in a beam caused by temperature changes, comprising:
   a beam having an inherent amount of temperature induced twisting;
   a wrap helically bonded to said beam, said wrap comprising a wrap material type, a wrap cross-sectional profile, and a wrap angle; and
   wherein said wrap material, wrap cross-sectional profile and wrap angle are selectively chosen for providing a desired twist control of said beam, said twist control applying a predetermined twisting force to said beam for a predetermined temperature change.

17. The twist control system according to claim 16 wherein said inherent amount of temperature induced twisting of said beam is eliminated by said wrap.

18. The twist control system according to claim 16 wherein said wrap is comprised of a structural member and a bonding agent.

19. The twist control system according to claim 18 wherein said wrap is formed of an isotropic material.

20. The twist control system according to claim 18 wherein said structural member is a metal wire and said bonding agent is an epoxy resin.

21. The twist control system according to claim 16 further comprising at least a second wrap wherein each of said wraps are selectively chosen for said beam to provide said desired twist control.

22. The system according to claim 16 wherein said beam is a composite construction.

* * * * *